United States Patent
Wang et al.

Patent Number: 5,982,464
Date of Patent: Nov. 9, 1999

[54] MULTI-TWIST COLOR LIQUID CRYSTAL DISPLAY

[75] Inventors: Xin-Jiu Wang; Kai C. Su, both of Alpharetta, Ga.

[73] Assignee: Technoloogy Resource International Corporation, Alpharetta, Ga.

[21] Appl. No.: 09/213,066

[22] Filed: Dec. 16, 1998

[51] Int. Cl.$^6$ .................. G02F 1/1335; G02F 1/1347; C09K 19/02

[52] U.S. Cl. ................ 349/108; 349/106; 349/75; 349/78; 349/180

[58] Field of Search .................. 349/106, 108, 349/75, 78, 180

[56] References Cited

U.S. PATENT DOCUMENTS

| | | | |
|---|---|---|---|
| 3,784,280 | 1/1974 | Bigelow | 350/150 |
| 3,972,590 | 8/1976 | Gelber | 350/160 |
| 4,019,807 | 4/1977 | Boswell et al. | 350/160 |
| 4,637,896 | 1/1987 | Shannon | 252/299 |
| 4,659,182 | 4/1987 | Aizawa | 350/339 |
| 4,886,343 | 12/1989 | Johnson | 350/335 |
| 4,968,120 | 11/1990 | Depp et al. | 350/337 |
| 4,974,941 | 12/1990 | Gibbons et al. | 350/349 |
| 5,029,986 | 7/1991 | De Vaan | 350/338 |
| 5,032,009 | 7/1991 | Gibbons et al. | 350/341 |
| 5,073,294 | 12/1991 | Shannon et al. | 252/299 |
| 5,105,289 | 4/1992 | Sonehara et al. | 359/70 |
| 5,142,392 | 8/1992 | Ueki et al. | 359/67 |
| 5,150,235 | 9/1992 | Haim et al. | 359/68 |
| 5,155,608 | 10/1992 | Hatano | 359/53 |
| 5,243,451 | 9/1993 | Kanemoto et al. | 359/53 |
| 5,300,928 | 4/1994 | Yamazaki | 345/88 |
| 5,389,698 | 2/1995 | Chigrinov et al. | 522/2 |
| 5,452,113 | 9/1995 | Ikeno | 359/53 |
| 5,463,481 | 10/1995 | Yamamura | 359/53 |
| 5,479,282 | 12/1995 | Toko et al. | 359/75 |
| 5,499,126 | 3/1996 | Abileah et al. | 359/68 |
| 5,500,752 | 3/1996 | Schadt et al. | 359/76 |

(List continued on next page.)

Primary Examiner—William L. Sikes
Assistant Examiner—Tarifur R. Chowdhury
Attorney, Agent, or Firm—Needle & Rosenberg, P.C.

[57] ABSTRACT

A color display that includes an array of pixels having a top side and an opposite bottom side. Each pixel includes a material having a first optical state exhibiting birefringence and a second optical state different from the first optical state. Each pixel also includes an element capable of driving the pixel to a selected one of the first optical state or the second optical state. A first selected group of pixels of the array has a first pair of axes of optical birefringence when each pixel of the first selected group is in the first optical state and at least a second selected group of pixels of the array has a second pair of axes of optical birefringence, different from the first pair of axes of optical birefringence, when each pixel of the second selected group is in the first optical state. A reflective layer is disposed adjacent the bottom side and a polarizing layer, having a predetermined polarity orientation, is disposed adjacent the top side. The first pair of axes of optical birefringence are oriented relative to the polarity orientation so that when a first selected pixel of the first selected group of pixels is in the first optical state, light entering the first selected pixel through the polarizing layer, reflecting from the reflective layer and exiting the first selected pixel through the polarizing layer appears as a first color. Also, when the first selected pixel is in the second optical state, light exiting the first selected pixel through the polarizing layer does not appear as the first color. The second pair of axes of optical birefringence are oriented relative to the polarity orientation so that when a second selected pixel of the second selected group of pixels is in the first optical state, light entering the second selected pixel through the polarizing layer, reflecting from the reflective layer and exiting the second selected pixel through the polarizing layer appears as a second color, different from the first color. Similarly, when the second selected pixel is in the second optical state, light exiting the second selected pixel through the polarizing layer does not appear as the second color.

27 Claims, 5 Drawing Sheets

U.S. PATENT DOCUMENTS

| | | | |
|---|---|---|---|
| 5,528,401 | 6/1996 | Narutaki et al. | 359/76 |
| 5,583,678 | 12/1996 | Nishino et al. | 349/118 |
| 5,610,743 | 3/1997 | Tsai | 349/124 |
| 5,657,105 | 8/1997 | McCartney | 349/157 |
| 5,671,031 | 9/1997 | Nakamura et al. | 349/106 |
| 5,715,028 | 2/1998 | Abileah et al. | 349/117 |
| 5,726,723 | 3/1998 | Wang et al. | 349/75 |
| 5,734,457 | 3/1998 | Mitsui et al. | 349/106 |
| 5,737,045 | 4/1998 | Abileah | 349/104 |
| 5,781,265 | 7/1998 | Lee | 349/171 |
| 5,784,139 | 7/1998 | Chigrinov et al. | 349/117 |
| 5,817,743 | 10/1998 | Gibbons et al. | 528/353 |

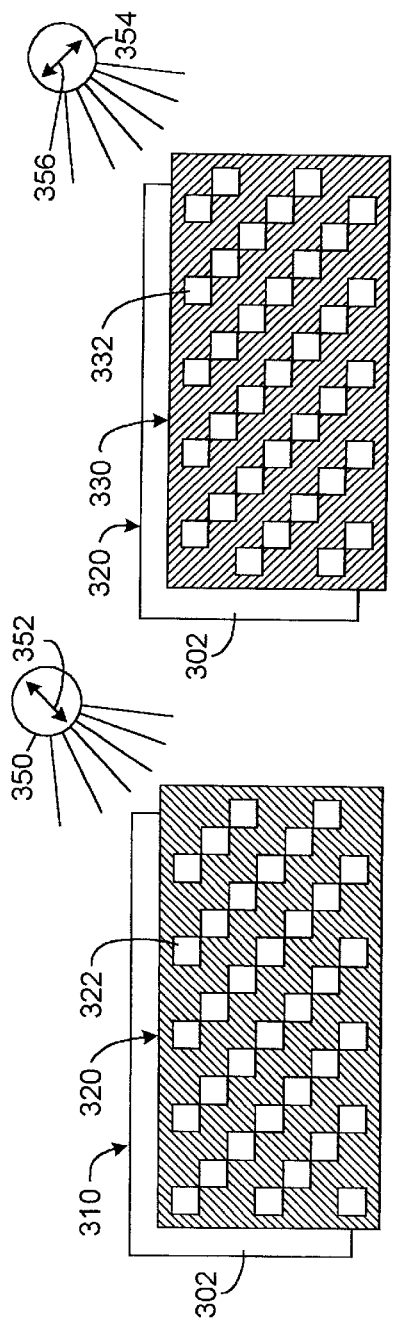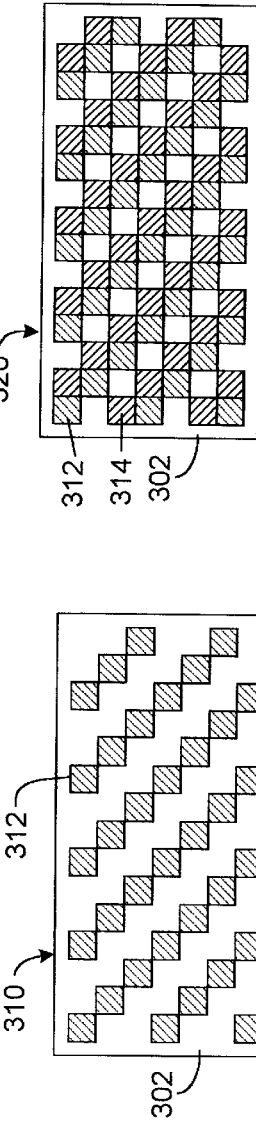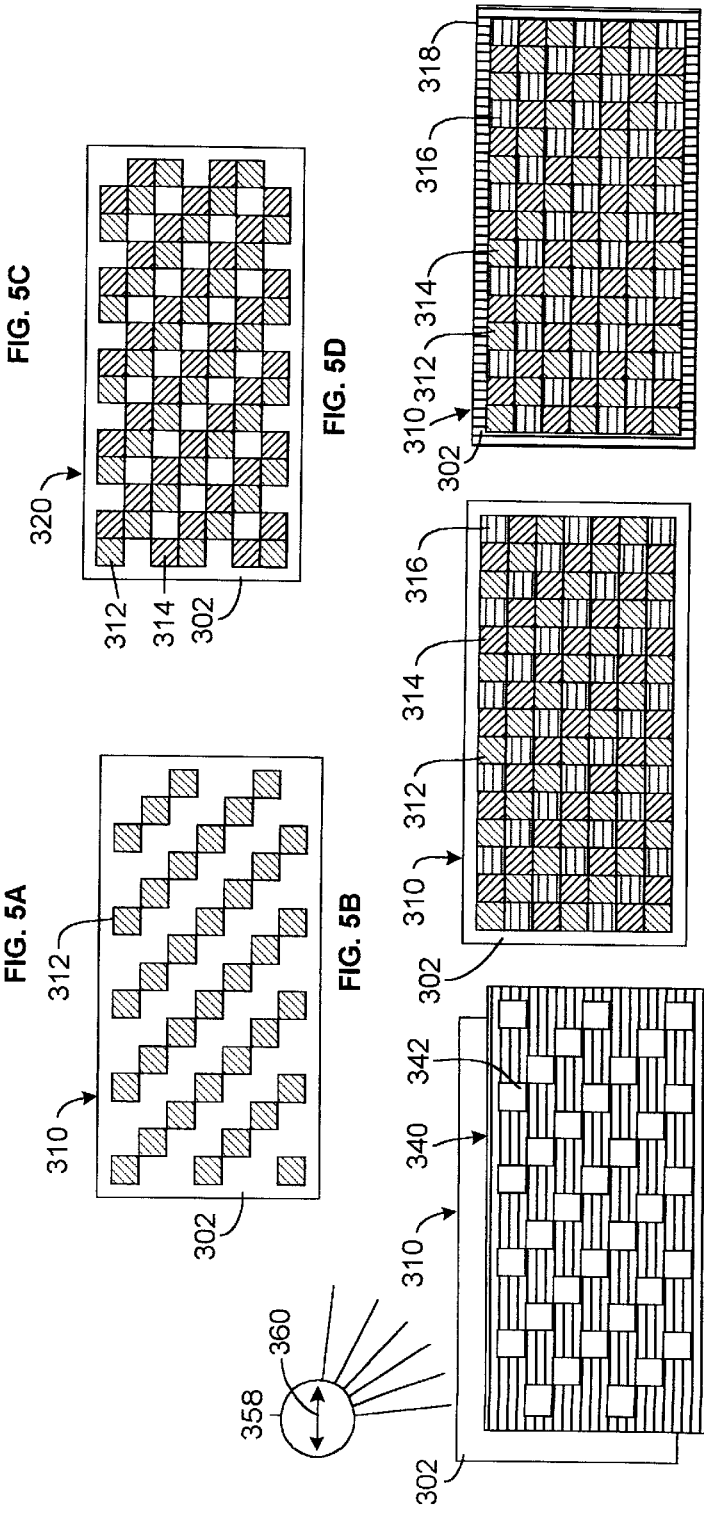

MULTI-TWIST COLOR LIQUID CRYSTAL DISPLAY

BACKGROUND OF THE INVENTION

1. Field of the Invention

The present invention relates to liquid crystal displays and, more specifically, to a color liquid crystal display (LCD) in which different pixels are capable of exhibiting different colors.

2. Description of the Prior Art

Liquid Crystal Displays (LCDs) take advantage of the ability of certain materials having a liquid crystal phase to control the transmission of visible light. Materials that have a liquid crystal phase exhibit flow characteristics similar to those of liquids, but, unlike liquids, have a certain amount of molecular ordering. Some liquid crystals also exhibit optical anisotropy, which means that light passing through the crystal is treated differently as it passes along different axes. Some of these liquid crystals also exhibit a certain amount of deformation of molecular ordering when subjected to an electric field. These liquid crystals are useful in making LCDs. A more complete description of liquid crystals and LCDs may be found in Collins, Peter J., *Liquid Crystals. Nature's Delicate Phase of Matter*, Princeton University Press, Princeton, N.J., 1990, which is incorporated herein by reference for the purpose of providing background information only.

Several types of LCDs are discussed in U.S. Pat. No. 5,726,723, which is also incorporated herein by reference. When applied to color displays, existing displays use either a plurality of color filters or dye doping of liquid crystal regions to create multiple pixels having different colors. Such displays have a first disadvantage of absorbing relatively high amounts of light, thereby making them optically inefficient (thus, making them unsuitable for low power reflective display applications). They also have a second disadvantage in that they are complicated and expensive to produce.

SUMMARY OF THE INVENTION

The disadvantages of the prior art are overcome by the present invention which, in one aspect, is a color display that includes an array of pixels having a top side and an opposite bottom side. Each pixel includes a material having a first optical state exhibiting birefringence and a second optical state different from the first optical state. Each pixel also includes an element capable of driving the pixel to a selected one of the first optical state or the second optical state. A first selected group of pixels of the array has a first pair of axes of optical birefringence when each pixel of the first selected group is in the first optical state and at least a second selected group of pixels of the array has a second pair of axes of optical birefringence, different from the first pair of axes of optical birefringence, when each pixel of the second selected group is in the first optical state. A reflective layer is disposed adjacent the bottom side and a polarizing layer, having a predetermined polarity orientation, is disposed adjacent the top side. The first pair of axes of optical birefringence are oriented relative to the polarity orientation so that when a first selected pixel of the first selected group of pixels is in the first optical state, light entering the first selected pixel through the polarizing layer, reflecting from the reflective layer and exiting the first selected pixel through the polarizing layer appears as a first color. Also, when the first selected pixel is in the second optical state, light exiting the first selected pixel through the polarizing layer does not appear as the first color. The second pair of axes of optical birefringence are oriented relative to the polarity orientation so that when a second selected pixel of the second selected group of pixels is in the first optical state, light entering the second selected pixel through the polarizing layer, reflecting from the reflective layer and exiting the second selected pixel through the polarizing layer appears as a second color, different from the first color. Similarly, when the second selected pixel is in the second optical state, light exiting the second selected pixel through the polarizing layer does not appear as the second color.

In another aspect, the display is a transmissive display that includes a first polarizing layer disposed adjacent the bottom side and a second polarizing layer disposed adjacent the top side.

The first polarizing layer has a first predetermined polarity orientation and the second polarizing layer has a second predetermined polarity orientation. In this aspect, the first pair of axes of optical birefringence are oriented relative to the first predetermined polarity orientation and to the second predetermined polarity orientation so that when a first selected pixel of the first selected group of pixels is in the first optical state, light entering the first selected pixel through the first polarizing layer, and exiting the first selected pixel through the second polarizing layer appears as a first color. When the first selected pixel is in the second optical state, light exiting the first selected pixel through the second polarizing layer does not appear as the first color. The second pair of axes of optical birefringence are oriented relative to the first predetermined polarity orientation and to the second predetermined polarity orientation so that when a second selected pixel of the second selected group of pixels is in the first optical state, light entering the second selected pixel through the first polarizing layer and exiting the second selected pixel through the second polarizing layer appears as a second color, different from the first color. When the second selected pixel is in the second optical state, light exiting the second selected pixel through the second polarizing layer does not appear as the second color.

Yet another aspect of the invention is a method of constructing an array of pixels for use in a multi-pixel liquid crystal display. A first substrate is coated with a photo-alignable compound, thereby forming a first orientation surface. A first mask is placed over the first orientation surface, the first mask defining a first plurality of windows, each window corresponding to a selected pixel of a first group of pixels of the display so that a first portion of the first orientation surface subtends the first plurality of windows. The first portion of the first orientation surface subtending the first plurality of windows is illuminated with a linearly polarized ultra-violet light having a first polar orientation, so that the photo-alignable compound of the first orientation surface subtending the first plurality of windows becomes cured, so as to have a first orientation. A second mask is placed over the first orientation surface, the second mask defining a second plurality of windows, each window corresponding to a selected pixel of a second group of pixels of the display so that a second portion of the first orientation surface subtends the second plurality of windows. The second portion of the first orientation surface subtending the second plurality of windows is illuminated with a linearly polarized ultra-violet light having a second polar orientation, different from the first polar orientation, so that the photo-alignable compound of the first orientation surface subtending the second plurality of windows becomes cured, so as to have a second orientation, different from the first orientation. A second substrate is coated with a photo-alignable compound, thereby forming a second orientation surface. A third mask is placed over the second orientation surface, the third mask defining a third plurality of windows, each window corresponding to a selected pixel of the first group of pixels of the display so that a first portion of the second orientation surface subtends the third plurality of windows. The first portion of the second orientation surface subtending the third plurality of windows is illuminated with a linearly polarized ultra-violet light having a third polar orientation, so that the photo-alignable compound of the second orientation surface subtending the third plurality of windows becomes cured, so as to have a third orientation. A fourth mask is placed over the second orientation surface, the fourth mask defining a fourth plurality of windows, each window corresponding to a selected pixel of the second group of pixels of the display so that a second portion of the second orientation surface subtends the fourth plurality of windows. The second portion of the second orientation surface subtending the fourth plurality of windows is illuminated with a linearly polarized ultra-violet light having a fourth polar orientation, different from the third polar orientation, so that the photo-alignable compound of the second orientation surface subtending the fourth plurality of windows becomes cured, so as to have a fourth orientation, different from the third orientation. The first substrate and the second substrate are placed parallel to each other with the first orientation surface and the second orientation surface facing each other with the first portion of the first orientation surface in alignment with the third portion of the second orientation surface, thereby defining a cavity therebetween. A liquid crystal is then injected into the cavity and the edges of the cavity are sealed with a sealant.

In yet another aspect, the invention is a method of constructing an array of pixels for use in a multi-pixel liquid crystal display, in which the photo-alignable compound may be "written over." Thus, the orientation surfaces are initially illuminated with a linearly polarized ultra-violet light having a first polar orientation, so that the photo-alignable compound of the orientation surfaces becomes cured, so as to have a first orientation. Then a mask is placed over the orientation surfaces, the mask defining a plurality of windows, each window corresponding to a selected pixel of a group of pixels of the display so that a portion of the orientation surface subtends the first plurality of windows. In this method, any areas not subsequently exposed to ultra-violet light having polar orientations other than the first polar orientation will retain the first orientation.

Yet another aspect of the invention is a method of constructing an array of pixels for use in a multi-pixel liquid crystal display in which the substrates are coated with an orientation film that includes a guest dye to form orientation surfaces. Upon illuminating the orientation surfaces with polarized ultra-violet light, the molecules of the guest dye become aligned with the polar orientation of the polarized light.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 5A–5G are schematic diagrams showing the process employed in making the invention.

DETAILED DESCRIPTION OF THE INVENTION

Figure 1:
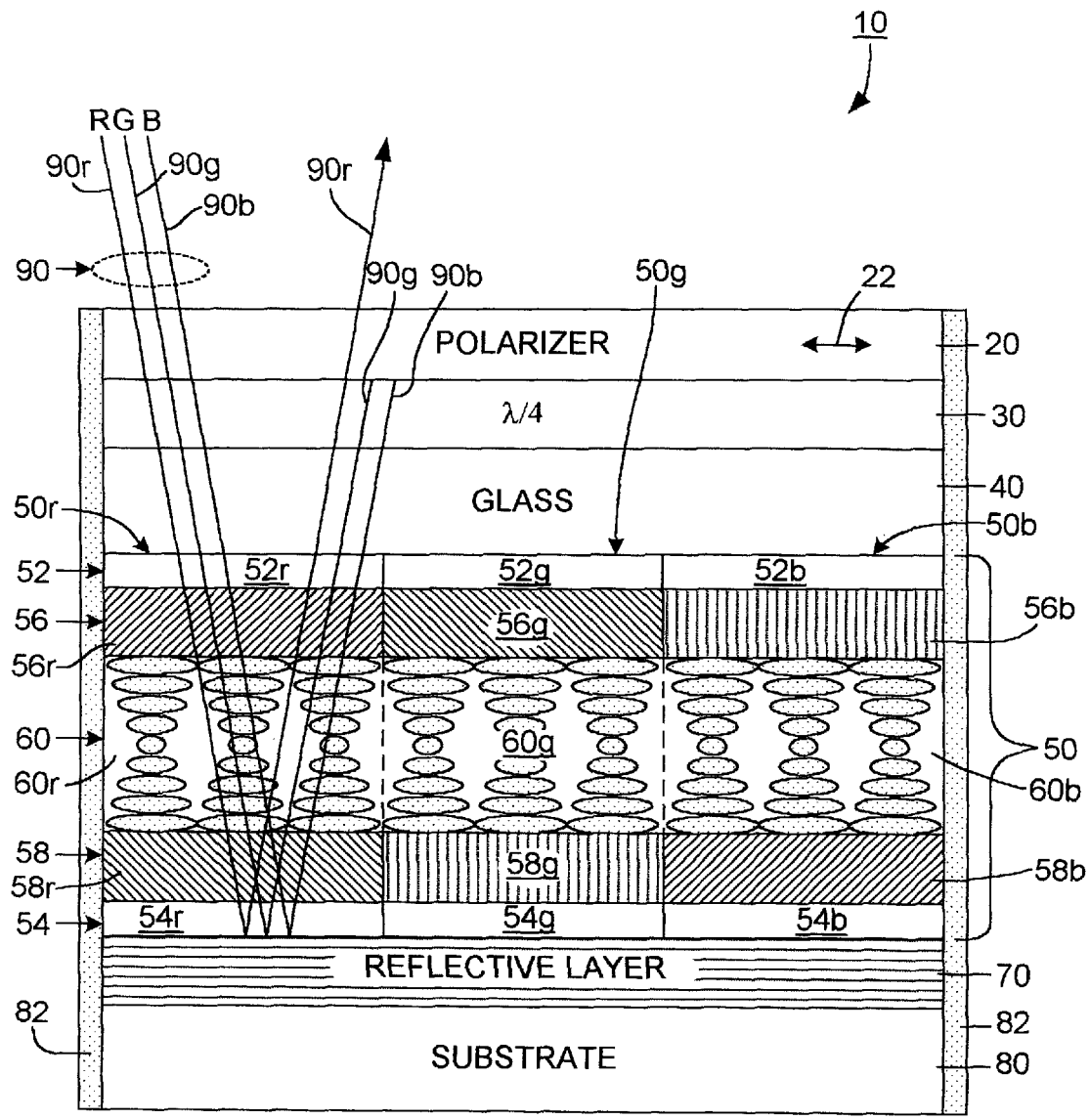
FIG. 1 is a side schematic view of three pixels of a reflective embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, the term "windows," in reference to a mask, means areas that are transparent to light. Such windows could include transparent areas on a film with blackened areas, they could also include holes in a mask.

As shown in FIG. 1, one embodiment of the invention is a display 10 that includes an array of pixels 50. The array of pixels 50 is disposed adjacent a transparent substrate 40. Suitable materials for the substrate 40 include glass, silicon and several other transparent solids, as are known in the art of LCD design. In some applications, an anisotropic solid could be used for the substrate 40. The transparent substrate 40 is disposed above the array 50 and a reflective layer 70 disposed beneath the array 50. Beneath the reflective layer 70 is a second substrate 80. The reflective layer 70 could comprise a reflective film or one of many other types of reflective layers generally known in the field liquid crystal display technology. Disposed above the transparent substrate 40 is a quarter-wave plate 30 and a polarizing layer 20 (also referred to herein as a polarizer). The quarter-wave plate 30 could comprise calcite, mica or a polymer. A retardation film (not shown) could be used instead of a quarter-wave plate. The polarizer 20 has a first polarity orientation 22, which means that it allows light to pass therethrough only when the light has a polarity substantially the same as the first polarity orientation 22, light having other orthogonal polarizations is absorbed by the polarizer 20.

For the sake of simplicity, FIG. 1 shows an array of pixels 50 having only three pixels: a red pixel 50r, a green pixel 50g, and a blue pixel 50b. It is understood that an actual display in accordance with the invention may comprise thousands of pixels. Also, while the term "pixel" is sometimes used in the art to refer to a grouping of a red display dot, a green display dot and a blue display dot, as used herein "pixel" refers to a single dot of a display.

Generally, the array of pixels 50 comprises a liquid crystal layer 60 sandwiched between an upper orientation surface 56 and an opposite lower orientation surface 58. (It should be noted that FIG. 1 shows a plurality of ellipses in the liquid crystal layer 60. These are included to show only the presence of liquid crystal molecules. The orientation of these ellipses does not represent any actual directional or positional ordering of the liquid crystal molecules.) An upper indium tin oxide (ITO) layer 52, which acts as an electrode, is disposed above the upper orientation surface 56 and a lower ITO layer 54 is disposed below the lower orientation surface 58. (The ITO layer is not a continuous layer, but actually a plurality of discretely addressable electrodes.) Although ITO is used as the electrode in the embodiment disclosed herein, it is understood that the driving function could be accomplished using other transparent and conductive films, as are generally known to the art of LCD design. Furthermore, the display could employ an active matrix driver using, for example, a plurality of thin film transistors (TFT).

An edge sealant 82 is applied to the edges of the display 10 to prevent leakage of the liquid crystal 60 from the array of pixels 50. The edge sealant 82 also serves to maintain the space between the upper orientation surface 56 and the lower orientation surface 58. Any edge sealant commonly used with LCD's may be used.

The liquid crystal in the liquid crystal layer 60 must be a material having a nematic liquid crystal phase that exhibits at least a first optical state exhibiting birefringence when subjected to a first electrical field (including one having a zero field strength—a "field off state") and a second optical state, different from the first optical state, when subjected to a second electrical field, different from the first electrical field. The second optical state could include a state that exhibits little or no birefringence in the beam direction.

When in the first birefringent state, the liquid crystal material has two transverse axes of birefringence. This means that a component of an electromagnetic wave entering the material having an E-field vector along a plane parallel to a first of the axes will propagate through the material at a first speed, whereas a component entering the material having an e-field vector along a plane parallel to a second of the axes will propagate through the material at a second speed. Thus, the material exhibits two different indices of refraction, depending on which plane the component of an electromagnetic wave is propagating along as it enters the material. This is a property exhibited by some twisted liquid crystal materials. One such liquid crystal is a twisted nematic liquid crystal having a twist angle of greater than 90° such as a chiral-doped non-compensated super-twisted nematic liquid crystal (XSTN). Other types of nematic liquid crystals will work with the present invention, including twisted nematic (TN), super-twisted nematic (STN) and sub-twisted nematic (SbTN). For any one of these types of liquid crystal to be used in the invention, it must have a phase that exhibits birefringence.

Examining the array of pixels 50 in detail, the red pixel 50r includes: an upper electrode 52r, an upper orientation sub-surface 56r, a liquid crystal region 60r, a lower orientation sub-surface 58r, and a lower electrode 54r. Similarly, the green pixel 50g includes: an upper electrode 52g, an upper orientation sub-surface 56g, a liquid crystal region 60g, a lower orientation sub-surface 58g, and a lower electrode 54g, and the blue pixel 50b includes: an upper electrode 52b, an upper orientation sub-surface 56b, a liquid crystal region 60b, a tower orientation sub-surface 58b, and a lower electrode 54b.

The liquid crystal regions 60r,g,b of each pixel 50r,g,b have different axes of birefringence. This is because the red pixel liquid crystal region 60r has a different twist orientation than that of green pixel liquid crystal region 60g and blue pixel liquid crystal region 60b. Similarly, the green pixel liquid crystal region 60g has a different twist orientation than that of red pixel liquid crystal region 60r and blue pixel liquid crystal region 60b. Likewise, the blue pixel liquid crystal region 60b has a different twist orientation than that of red pixel liquid crystal region 60r and green pixel liquid crystal region 60g. In this embodiment, the liquid crystal 60 is of the XSTN type, has a thickness of, e.g., 670 nm and a thickness over intrinsic pitch (resulting from chiral doping) of, e.g., 0.43. By having different twist orientations, the liquid crystal in the different regions have different axes of birefringence while in the field off state.

The liquid crystal used is any of the common nematic liquid crystals used in LCD's. The chiral dopant could comprise S811 or CB15 (among others) and could have a concentration of about 0.1% when using a TN or SbTN embodiment and 0.5% when using STN or XSTN.

The twist orientation, as used herein, is a function of the liquid crystal's twist angle and upper surface anchoring direction. The upper surface anchoring direction is the angle from the polar orientation 22 of the polarizer 20 to the director of the liquid crystal 60 adjacent the upper orientation sub-surface 56. (The director of a liquid crystal is an imaginary line corresponding to the direction that any given liquid crystal molecule is most likely to be oriented.) The twist angle is the amount of angular rotation of the liquid crystal director as it moves from the upper orientation sub-surface 56 to the lower orientation sub-surface 58.

In this embodiment, the liquid crystal 60r of the red pixel 50r has an upper surface anchoring direction of −2° C. and a twist angle of 190°. The liquid crystal 60g of the green pixel 50g has an upper surface anchoring direction of 17° and a twist angle of 190°. The liquid crystal 60b of the blue pixel 50b has an upper surface anchoring direction of 25° and a twist angle of 165°. Many other twist angles and surface anchoring directions may be employed without departing from the scope of the invention.

Figure 2:
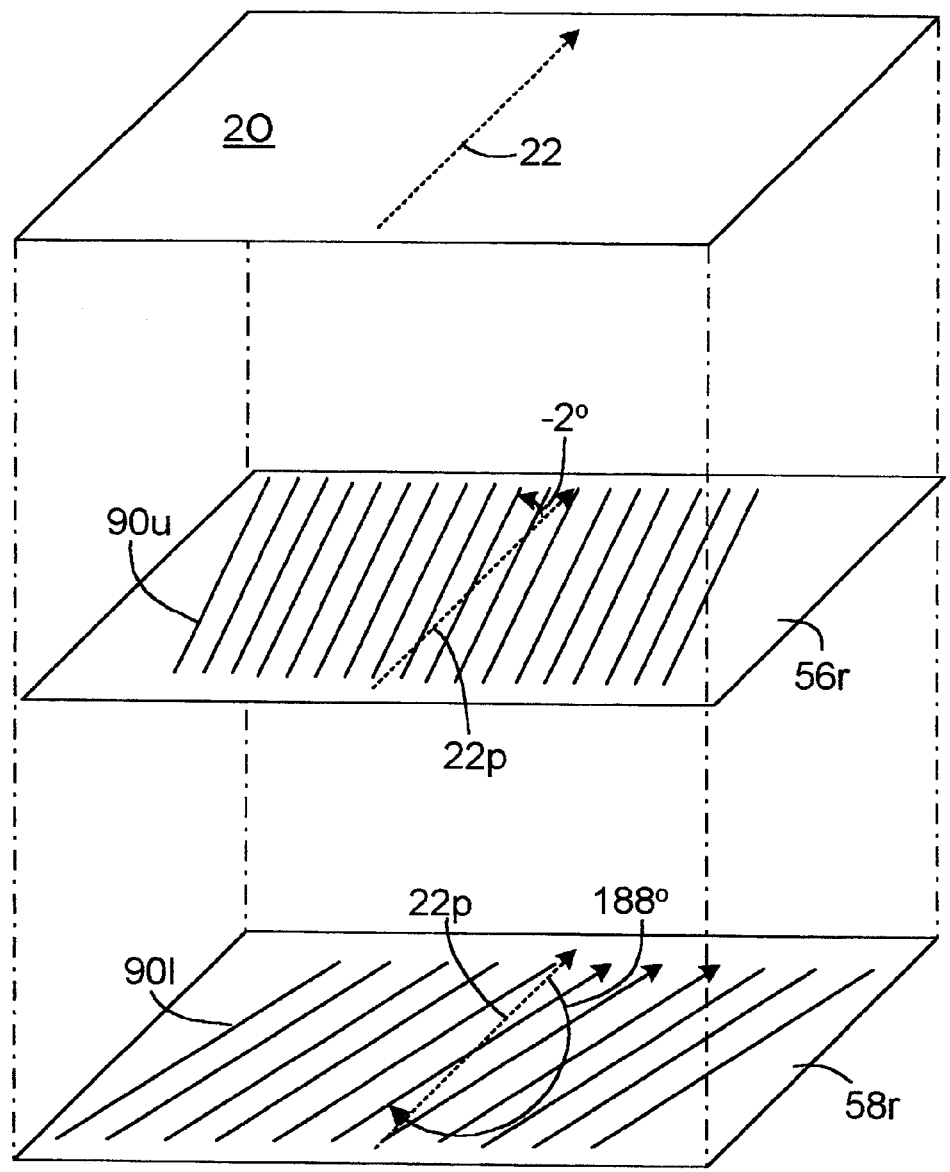
FIG. 2 is an exploded diagram of the polarizer and the orientation surfaces of the red pixel shown in FIG. 1, demonstrating how twist angle is achieved in the liquid crystal.

The twist angle is achieved because liquid crystals tend to orient themselves with molecular orientations on surfaces to which they are adjacent. For example, as shown in FIG. 2, the upper orientation sub-surface 56r of the red pixel 50r has upper surface molecular orientations 90u that run parallel to a −2° angle from the polar orientation 22 of the polarizer. Similarly, the corresponding lower orientation sub-surface 58r has molecular orientations 901 that run parallel to a 188° angle from the polar orientation 22. When a liquid crystal material is injected into the region between the upper orientation sub-surface 56r and the lower orientation sub-surface 58r, the liquid crystal molecules near the upper orientation sub-surface 56r tend to align themselves with the upper surface molecular orientations 90u so that they are parallel to a −2° angle from the polar orientation 22. The same process occurs with the liquid crystal molecules near the lower orientation sub-surface 58r, causing them to align themselves parallel to a 188° angle from the polar orientation 22. The liquid crystal molecules in-between tend to align themselves with their nearest neighbors so that the director of the liquid crystal tends to rotate from alignment with the molecular orientations on the upper orientation sub-surface 56r to alignment with the molecular orientations on the lower orientation sub-surface 58r in a helical fashion. A small amount of a chiral dopant is added to the twisted nematic liquid crystal, thus making a chiral doped liquid crystal, to ensure that the director uniformly rotates in one direction (i.e., clockwise or counter-clockwise) from upper to lower throughout the liquid crystal layer 60. The twisting process is the same for both the green pixel 50g and the blue pixel 50b.

The orientation sub-surfaces 56r and 58r of the red pixel 50r have molecular orientations that are different from the molecular orientations of the orientation sub-surfaces 56g and 58g of the green pixel 50g and the orientation sub-surfaces 56b and 58b of the blue pixel 50b, which also have different molecular orientations from each other.

To understand the operation of this embodiment, returning to FIG. 1, consider a beam of white light 90 entering the display 10. (The beam shown is simplified as having only a red component 90r, a green component 90g and a blue component 90b. This is a simplification, as white light may comprise many different components from the entire spectrum of visible light.) If, hypothetically only, the liquid crystal 60 were absent, then components having a polarization substantially the same as the polarization orientation 22 would pass through the polarizer 20, whereas the other components would be absorbed by the polarizer 20. The quarter-wave plate 30 would change the polarization of the beam 90 from linear polarization along one axis (for example x-linear polarization) to circular polarization. The light would then be reflected off of the reflective layer 70 and the polarization of the reflected beam would changed from circular polarization to linear polarization along a second, orthogonal axis (for example y-linear polarization) by the quarter wave elate 30 so that the polarizer 20 would now act as a crossed polarizer to the polarization axis of the beam 90. Thus all components of the beam 90, including the red component 90r, would be absorbed by the polarizer 20 and the display 10 would appear dark. The above example is hypothetical and presented only to facilitate understanding of the display 10. In an actual embodiment, liquid crystal 60 would be present at all times.

Now consider the beam 90 in an actual system, in which the liquid crystal 60 is present, as it passes through the red pixel 50r while no voltage is applied between the upper electrode 52r and the lower electrode 54r (this is referred to herein as the "field off state"). When in the field off state, the liquid crystal 60r is in a first optical state exhibiting birefringence. As the beam passes through the polarizer 20, only those components of the beam 90 having a polarization axis parallel to the polarization orientation 22 pass through the polarizer 20, with the remaining components being absorbed by the polarizer 20. The quarter-wave plate 30 changes the polarization of the beam 90 from linear to circular, as before.

Because the liquid crystal 60r is an anisotropic medium that exhibits optical birefringence while in the first optical state, the polarization axis of the beam 90 is changed by the liquid crystal 60r. Actually, the beam 90 comprises several different components 90r,g,b of different wavelengths and the anisotropy of the liquid crystal 60r causes different amounts of polarization rotation, or other optical effect, for different wavelengths. Therefore, the liquid crystal 60r rotates the polarizations of the red component 90r, the green component 90g and the blue component 90b by different amounts.

In the liquid crystal 60r, the amount of birefringence is a function of the twist angle, the thickness and the birefringence of the liquid crystal 60r. Thus, in the red region of the liquid crystal, the thickness, the upper surface anchoring direction, and the twist angle are all chosen so that when the red pixel 50r is in the field off state, the polarization of the red component 90r will be rotated by a total of 90° as it makes the complete trip through the liquid crystal 60r, reflects off of the reflective layer 70 and passes out of the liquid crystal 60r. Therefore, once the red component 60r exits the quarter-wave plate 30 on the return trip from the reflective layer 70, its polarization axis has been rotated by a total of 180° from the polarization orientation 22 of the polarizer 20, thereby allowing it to pass through the polarizer 20 with relatively little attenuation. On the other hand, the liquid crystal 60r does not rotate the polarization axes of the green component 90g and the blue component 90b in the same way as it rotates the red component 90r. The final rotation is such that the polarization orientations of these components are something other than the amount necessary to make the polarization orientations parallel to the polarization orientation 22 of the polarizer 20. Thus, the green component 90g and the blue component 90b are substantially absorbed by the polarizer 20. Therefore, the red pixel 50r appears red in the field-off state, as only light of the red component 90r of the beam 90 passes out of the red pixel 50r.

This situation changes drastically when a voltage is applied between the upper electrode 52r and the lower electrode 54r, putting the pixel 54r in the "field-on" state. (In this embodiment, the field-on state occurs when a voltage above a deformation threshold for the liquid crystal is applied between electrodes 52 and 54. The "field-off" state is when the voltage is below that threshold, even though there might actually be an electric field between the electrodes during the field-off state.) In this case an electric field exists between the two electrodes 52r and 54r which causes deformation of the ordering of the liquid crystal 60r. This deformation puts the liquid crystal 60r into a second optical state (which could be exhibiting either different birefringence or no birefringence). In this state, the red component 90r, as well as the green component 90g and the blue component 90b are not rotated by the precise amount necessary for any of the components of the beam 90 to be allowed to pass through the polarizer. Therefore, the red pixel 50r appears dark when in the field-on state.

The optical process is the same for both the green pixel 50g and the blue pixel 50b. Therefore, by controlling the voltages applied to the electrodes 52r,g,b and 54r,g,b, the display can selectively allow transmittance of red light, green light or blue light from the red pixel 50r, the green pixel 50g or the blue pixel 50b, respectively, or these pixels may appear dark. As is generally understood in the art of display design, by combining light of these three colors, the display 10 can be made to appear to be transmitting most of the colors of the visible spectrum. If the quarter wavelength plate 30 were removed from this embodiment, then each pixel 50 would appear as a complimentary color to the one recited above while the pixel 50 is in the field-off state.

Figure 3:
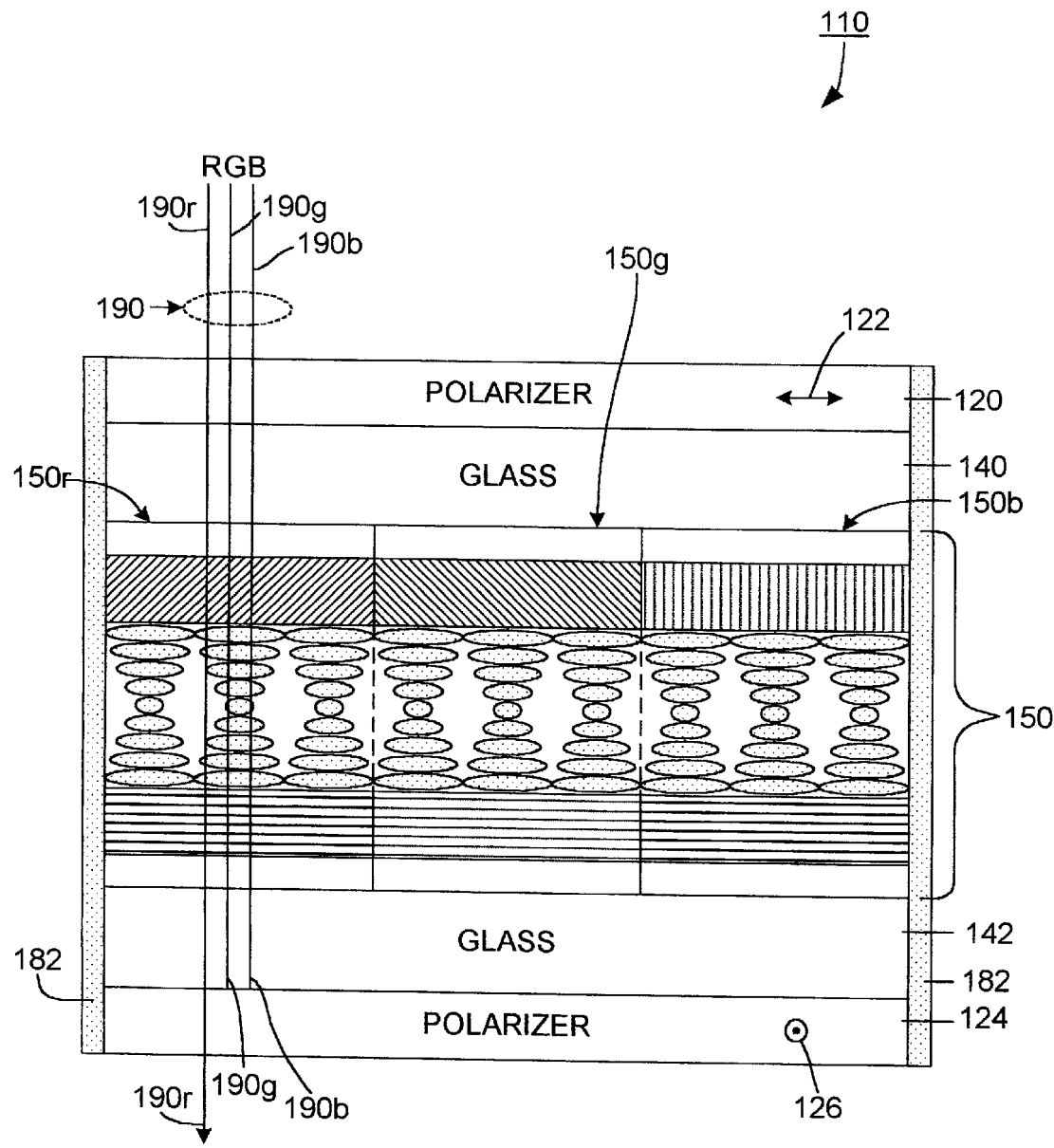
FIG. 3 is a side schematic view of three pixels of a transmissive embodiment of the invention.

As shown in FIG. 3, a transmissive liquid crystal display 110 in accordance with the invention includes an array of pixels 150 (including red 150r, green 150g and blue 150b) that has a first polarizer 120 and transparent substrate 140 disposed above the array 150. However, unlike the reflective embodiment of FIG. 1, the transmissive embodiment does not include a reflective layer. Instead, it has a second transparent substrate 142 and a second polarizer 124 disposed beneath it. In this example, the second polarizer 124 has a polarization orientation 126 that is orthogonal to the polarization orientation 122 of the first polarizer 120. In other embodiments, polarization orientation 126 is not necessarily orthogonal to polarization orientation 122.

When a beam of light 190 enters the red pixel 150r (for example) while in the field off state, the birefringence of the liquid crystal in the pixel 150r causes the red component 190r to rotate by 90°, while causing the other components 190g,b to rotate by an amount other than 90°. Thus, the red component 190r has a polarization orientation that allows it to pass through the second polarizer 124 and the blue and green components 190g,b have polarization orientations that cause them to be substantially absorbed by the second polarizer 124. In the field on state, none of the components 190r,g,b have polarization orientations that would allow them to pass through the second polarizer 124, causing the pixel 150r to appear dark. Again, the process is the same for the green pixel 150g and the blue pixel 150b. This embodiment could be used as part of back-lit display or a projection display.

With the addition of a half-wave plate (not shown) the display 110 could be changed from a positive mode display to a negative mode display. A negative mode display is one in which the opposites of the primary colors are transmitted by the display (such as a cyan, magenta, yellow—CMY—display).

In one embodiment of a transmissive display, in accordance with FIG. 3, the product of the birefringence and the cell thickness is 900 nm. The bottom surface anchoring direction of all pixels is 45° from the second polarization orientation 126. The top surface anchoring direction of the red pixel 150r is 28° from the first polarization orientation 122. The top surface anchoring direction of the green pixel 150g is 54° and the top surface anchoring direction of the blue pixel 150b is 68°. Thus, the red pixel twist angle is 217°, the green pixel twist angle is 191° and the blue pixel twist angle is 177°.

Figure 4:
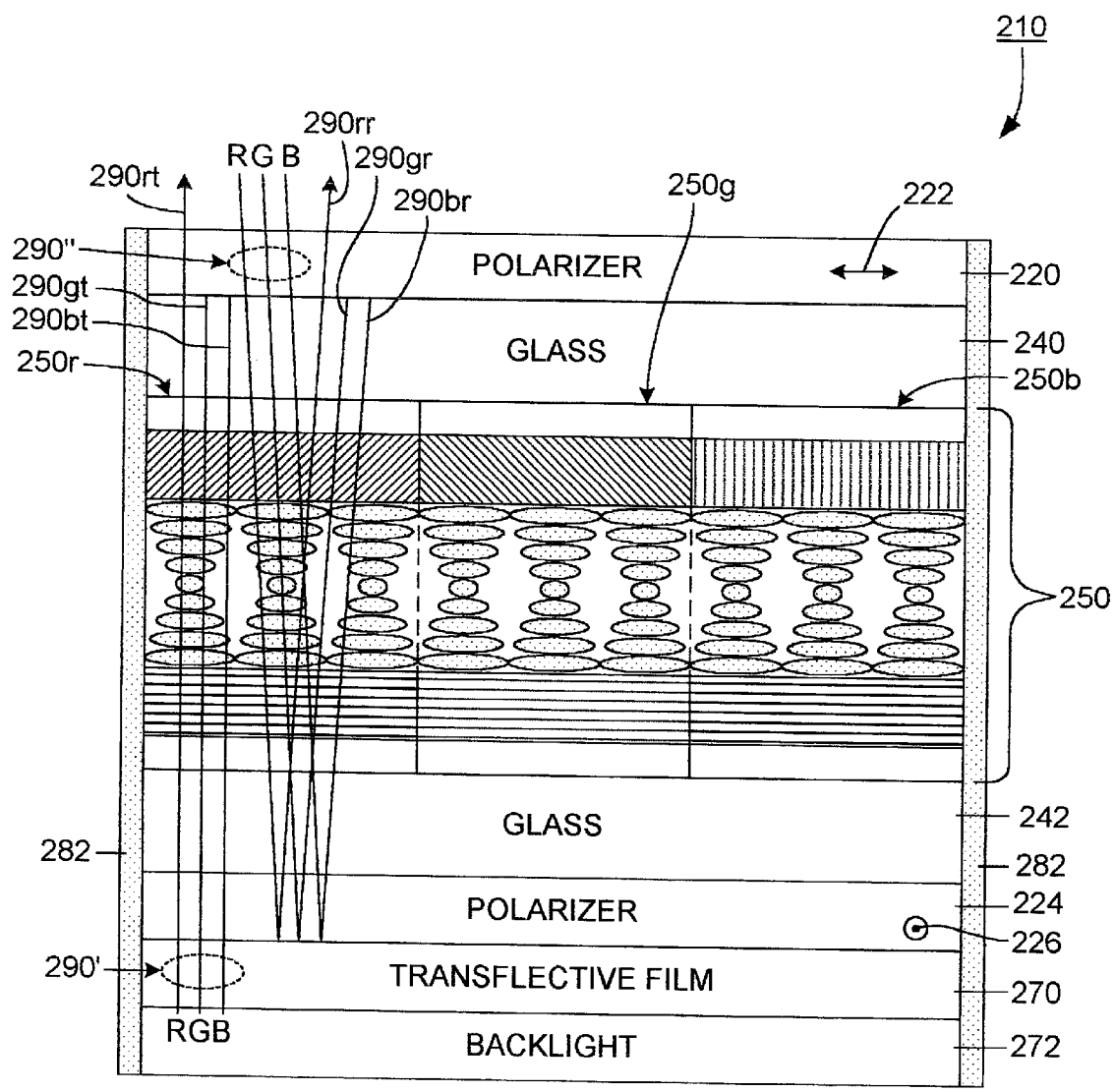
FIG. 4 is a side schematic view of three pixels of a transflective embodiment of the invention.

A hybrid of the embodiments shown in FIGS. 1 and 3 is shown in FIG. 4. In this "transflective" embodiment, the display 210 has a partially reflective film 270 (a "transflective" film) disposed adjacent the second polarizer 224 and a backlight 272 is disposed adjacent the transflective film 270. In conditions where there is ample ambient light 290", the backlight 272 is turned off and the display 210 works in the reflective mode, thereby conserving battery power. At times were there is insufficient ambient light, the backlight 272 is turned on so as to generate light 290' and the display 210 works in the transmissive mode. (In FIG. 4, the beam components exiting the display in the transmissive mode are designated 290rt, 290gt and 290bt. The beam components exiting the display in the reflective mode are designated 290rr, 290gr and 290br.)

One process that could be employed to make the orientation surfaces of a display in accordance with the invention is shown in FIGS. 5A–5G. The example given will describe the making of the top orientation surface of an RGB display. However, the same process is used in making the bottom orientation surface. Also, this process could be employed in making a display of any color arrangement, in accordance with the invention.

First, as shown in FIG. 5A, a substrate 310 is coated with a photo-alignable compound. Such a compound could include a pre-polymer. This forms an orientation surface 302. A first mask 320 is placed over the orientation surface 302. The first mask defines a first plurality of windows 322, with each window 322 corresponding to a selected pixel type (such as a red pixel) of the display. Thus, a first portion of the orientation surface 302 subtends the first plurality of windows 322.

Next, the first portion of the orientation surface 302 is illuminated with a linearly polarized light 350 having a first polar orientation 352. In one embodiment, the light could be ultra-violet in the range of 300 nm to 360 nm, however other wavelengths of light could also be employed. The first polar orientation 352 is parallel (or could be perpendicular) to the top surface anchoring direction of the red pixel. The photo-alignable compound of the orientation surface 302 subtending the first plurality of windows 322 becomes cured so as to have a first orientation. If the photo-alignable compound is a cross linkable polymer, then the curing process occurs when the molecules of the polymer become cross-linked.

The result of this step, as shown in FIG. 5B, is that the orientation surface 302 has a plurality of areas 312 that have a first molecular orientation. These areas 312 will serve to anchor the liquid crystal of the red pixels.

Next, as shown in FIG. 5C, a second mask 330 is placed over the orientation surface 302. The second mask 330 defines a second plurality of windows 332, each of which corresponding to a pixel type (e.g., green) of the display.

The portion of the orientation surface 302 subtending the second plurality of windows 332 is then illuminated with a linearly polarized light 354 having a second polar orientation 356, corresponding to the top surface anchoring angle of the green pixels. The illumination continues until the photo-alignable compound of the orientation surface 302 subtending the second plurality of windows 332 becomes cured. This forms a second plurality of areas 314 that have a second molecular orientation. These areas 314 will serve to anchor the liquid crystal of the green pixels. The result of this step is shown if FIG. 5D.

As shown in FIG. 5E, this process is repeated using a third mask 340 having a third plurality of windows 342 and a third linearly polarized light 358 having a third polarization orientation 360. As shown in FIG. 5F, this results in the orientation surface 302 having a third plurality of areas 316 having a third molecular orientation, in addition to the first plurality of areas 312 and the second plurality of areas 314. These areas 316 will serve to anchor the liquid crystal of the blue pixels.

Optionally, as shown in FIG. 5G, a mask allowing light to pass around all of the pixel areas can be used to generate a background area 318, thereby creating a display having a controllable background color.

Some photo-alignable materials allow themselves to be "written over" so that their molecules will first align themselves with a first light and subsequently align themselves with a second light. Using one of these types of materials, it would be possible to do away with one of the masks recited above. For example, the first step would involve illuminating the entire orientation surface with a first linearly polarized light and then following the steps shown in FIGS. 5C–5G.

In the process disclosed above, the photo-curable polymer could be a photo polymer available from Elsicon, Inc., Quillen Building, Suite 1C1, 3521 Silverside Road, Wilmington, Del. 19810. The masks would be similar to the type of masks used in semiconductor photolithography (although this embodiment would not require the same level of precision as that required in manufacturing integrated circuits). The ITO layers could be applied using one of several methods commonly used in LCD technology.

It is important to note that the above-described figures of the drawings disclosed herein are not drawn to scale. Certain features are exaggerated to aid in explaining the invention.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A color display, comprising:
   a. an array of pixels, each pixel comprising a material having a first optical state exhibiting birefringence and a second optical state different from the first optical state, each pixel including an element capable of driving the pixel to a selected one of the first optical state or the second optical state, the array having a top side and an opposite bottom side, a first selected group of pixels of the array having a first pair of axes of optical birefringence when each pixel of the first selected group is in the first optical state, at least a second selected group of pixels of the array having a second pair of axes of optical birefringence, different from the first pair of axes of optical birefringence, when each pixel of the second selected group is in the first optical state;

b. a reflective layer disposed adjacent the bottom side; and c. a polarizing layer disposed adjacent the top side, the polarizing layer having a predetermined polarity orientation, the first pair of axes of optical birefringence being oriented relative to the polarity orientation so that when a first selected pixel of the first selected group of pixels is in the first optical state, light entering the first selected pixel through the polarizing layer, reflecting from the reflective layer and exiting the first selected pixel through the polarizing layer appears as a first color and so that when the first selected pixel is in the second optical state, light exiting the first selected pixel through the polarizing layer does not appear as the first color, the second pair of axes of optical birefringence being oriented relative to the polarity orientation so that when a second selected pixel of the second selected group of pixels is in the first optical state, light entering the second selected pixel through the polarizing layer, reflecting from the reflective layer and exiting the second selected pixel through the polarizing layer appears as a second color, different from the first color, and so that when the second selected pixel is in the second optical state, light exiting the second selected pixel through the polarizing layer does not appear as the second color.

2. The color display of claim 1, wherein the material having a first optical state exhibiting birefringence comprises a liquid crystal material.

3. The color display of claim 2, wherein the liquid crystal material comprises a XSTN liquid crystal.

4. The color display of claim 3, wherein the XSTN liquid crystal has a twist angle between 90° and 270°.

5. The color display of claim 3, wherein the liquid crystal material comprises an SbTN liquid crystal having a twist angle between 0° and 90°.

6. The color display of claim 1, further comprising a quarter-wavelength plate disposed between the polarizing layer and the array of pixels.

7. The color display of claim 1, further comprising a retardation film disposed between the polarizing layer and the array of pixels.

8. The color display of claim 1, wherein the element capable of driving the pixel to a selected one of the first optical state or the second optical state comprises an electrode.

9. The color display of claim 8, wherein the electrode comprises ITO.

10. The color display of claim 1, wherein the element capable of driving the pixel to a selected one of the first optical state or the second optical state comprises an element of an active matrix.

11. The color display of claim 10, wherein the element of an active matrix comprises a thin film transistor.

12. The color display of claim 1, wherein the array of pixels further comprises at least a third selected group of pixels of the array having a third pair of axes of optical birefringence, different from the first and second pairs of axes of optical birefringence, when each pixel of the third selected group is in the first optical state, wherein the third pair of axes of optical birefringence are oriented relative to the polarity orientation so that when a third selected pixel of the third selected group of pixels is in the first optical state, light entering the third selected pixel through the polarizing layer, reflecting from the reflective layer and exiting the third selected pixel through the polarizing layer appears as a third color, different from the first and second colors, and so that when the third selected pixel is in the second optical state, light exiting the third selected pixel through the polarizing layer does not appear as the third color.

13. The color display of claim 12, wherein the first color is red, the second color is green and the third color is blue.

14. The color display of claim 12, wherein the first color is a color other than red, the second color is a color other than green and the third color is other than blue.

15. A color display, comprising:

a. an array of pixels, each pixel comprising a material having a first optical state exhibiting birefringence and a second optical state different from the first optical state, each pixel including an element capable of driving the pixel to a selected one of the first optical state or the second optical state, the array having a top side and an opposite bottom side, a first selected group of pixels of the array having a first pair of axes of optical birefringence when each pixel of the first selected group is in the first optical state, at least a second selected group of pixels of the array having a second pair of axes of optical birefringence, different from the first pair of axes of optical birefringence, when each pixel of the second selected group is in the first optical state;

b. a first polarizing layer disposed adjacent the bottom side and having a first predetermined polarity orientation; and c. a second polarizing layer disposed adjacent the top side and having a second predetermined polarity orientation, the first pair of axes of optical birefringence being oriented relative to the first predetermined polarity orientation and to the second predetermined polarity orientation so that when a first selected pixel of the first selected group of pixels is in the first optical state, light entering the first selected pixel through the first polarizing layer, and exiting the first selected pixel through the second polarizing layer appears as a first color and so that when the first selected pixel is in the second optical state, light exiting the first selected pixel through the second polarizing layer does not appear as the first color, the second pair of axes of optical birefringence being oriented relative to the first predetermined polarity orientation and to the second predetermined polarity orientation so that when a second selected pixel of the second selected group of pixels is in the first optical state, light entering the second selected pixel through the first polarizing layer and exiting the second selected pixel through the second polarizing layer appears as a second color, different from the first color, and so that when the second selected pixel is in the second optical state, light exiting the second selected pixel through the second polarizing layer does not appear as the second color.

16. The color display of claim 15, further comprising a partially reflective layer disposed adjacent the first polarizing layer.

17. The color display of claim 16, further comprising a backlight disposed adjacent the partially reflective layer.

18. The color display of claim 15, wherein the first predetermined polarity orientation is transverse to the second predetermined polarity orientation.

19. The color display of claim 15, wherein the material having a first optical state exhibiting birefringence comprises a liquid crystal material.

20. The color display of claim 19, wherein the liquid crystal material comprises a twisted nematic liquid crystal having a birefringent mode.

21. The color display of claim 19, wherein the liquid crystal material comprises an STN liquid crystal.

22. The color display of claim 21, wherein the STN liquid crystal has a twist angle between 90° and 270°.

23. The color display of claim 15, wherein the array of pixels further comprises at least a third selected group of pixels of the array having a third pair of axes of optical birefringence, different from the first and second pairs of axes of optical birefringence, when each pixel of the third selected group is in the first optical state, wherein the third pair of axes of optical birefringence are oriented relative to the polarity orientation so that when a third selected pixel of the third selected group of pixels is in the first optical state, light entering the third selected pixel through the first polarizing layer and exiting the third selected pixel through the second polarizing layer appears as a third color, different from the first and second colors, and so that when the third selected pixel is in the second optical state, light exiting the third selected pixel through the polarizing layer does not appear as the third color.

24. The color display of claim 23, wherein the first color is red, the second color is green and the third color is blue.

25. A color display, comprising:
  a. a polarizer having an upper side and an opposite lower side, the polarizer having polarization orientation;
  b. a quarter-wave plate disposed adjacent the lower side of the polarizer;
  c. a reflective layer disposed parallel to the quarter-wave plate so as to form a cavity therebetween;
  d. a liquid crystal disposed in the cavity, the liquid crystal having at least three regions, comprising:
    i. a first region having a first upper surface anchoring direction and a first twist angle that cause all non-red components of light propagating through the first region through the quarter-wave plate to be absorbed by the polarizer, thereby causing the first region to appear red when no electric field is applied thereto;
    ii. a second region having a second upper surface anchoring direction and a second twist angle that cause all non-green components of light propagating through the second region through the quarter-wave plate to be absorbed by the polarizer, thereby causing the second region to appear green when no electric field is applied thereto; and
    iii. a third region having an upper surface anchoring direction and a twist angle that cause all non-blue components of light propagating through the third region through the quarter-wave plate to be absorbed by the polarizer, thereby causing the third region to appear blue when no electric field is applied thereto; and
  e. a plurality of field-applying elements, each for selectively applying an electric field to each of the first region, the second region and the third region.

26. A color display, comprising:
  a. a polarizer having an upper side and an opposite lower side, the polarizer having polarization orientation;
  b. a quarter-wave plate disposed adjacent the lower side of the polarizer;
  c. a reflective layer disposed parallel to the quarter-wave plate so as to form a cavity therebetween;
  d. a liquid crystal disposed in the cavity, the liquid crystal having at least three regions, comprising:
    i. a first region having an upper surface anchoring direction of −2° and a twist angle of 190°;
    ii. a second region having an upper surface anchoring direction of 17° and a twist angle of 190°; and
    iii. a third region having an upper surface anchoring direction of 25° and a twist angle of 165°; and
  e. a plurality of field-applying elements, each for selectively applying an electric field to each of the first region, the second region and the third region.

27. A color display, comprising:
  a. means for linearly polarizing a beam of light, having a plurality of frequency components, so as to have a polarization;
  b. means for rotating the polarization of the beam of light by a predetermined amount;
  c. means for reflecting the beam of light from the polarizing means back to the polarizing means;
  d. means, disposed between the reflecting means and the rotating means, for anisotropicly causing the polarization of each frequency component to rotate by a different first predetermined amount, depending on the wavelength of the frequency component, when in a first state and for causing the polarization of each frequency component by a second amount, different from the first amount, when in a second state;
  e. means for selectively causing a first region of the display to be in either the first state, so as to cause light of a first preselected frequency component to pass from the reflecting means out of the polarizing means, or a second state, so as to cause light of the first preselected frequency component not to pass from the reflecting means out of the polarizing means; and
  f. means for selectively causing a second region of the display to be in either the first state, so as to cause light of a second preselected frequency component, different from the first preselected frequency component, to pass from the reflecting means out of the polarizing means, or a second state, so as to cause light of the second preselected frequency component not to pass from the reflecting means out of the polarizing means.

* * * * *